United States Patent
Hayashi et al.

[11] Patent Number: 5,229,887
[45] Date of Patent: Jul. 20, 1993

[54] COMPACT ZOOM LENS

[75] Inventors: Kiyoshi Hayashi, Tokyo; Atsushi Shibayama, Kawasaki, both of Japan

[73] Assignee: Nikon Corporation, Tokyo, Japan

[21] Appl. No.: 769,790

[22] Filed: Oct. 2, 1991

[30] Foreign Application Priority Data

Oct. 5, 1990 [JP] Japan .................................. 2-267931

[51] Int. Cl.$^5$ .............................................. G02B 15/14
[52] U.S. Cl. .................................................... 359/692
[58] Field of Search ................. 359/692, 687, 688, 690

[56] References Cited

U.S. PATENT DOCUMENTS 4,909,613 3/1990 Kikuchi .............................. 359/689
4,998,808 3/1991 Shibayama ..................... 359/692 O

FOREIGN PATENT DOCUMENTS 2-50118 2/1990 Japan .

Primary Examiner—Scott J. Sugarman
Attorney, Agent, or Firm—Shapiro and Shapiro

[57] ABSTRACT

A zoom lens comprises a first lens group having the positive refractivity which relatively travels along the optical axis to change the distance between the groups for varying powers, and a second lens group having negative refractivity. The first lens group has sequentially from an object side a first positive lens component, a second negative lens component, a third lens component having positive refractivity, a fourth positive lens component, and fifth lens component having positive refractivity, and the second lens group has sequentially from the object side a sixth positive lens component, a seventh negative lens component, and an eighth negative lens component. Further, the first lens group includes a diaphragm adjacent to the fifth lens component, and the zoom lens is characterized in being structured to satisfy conditions given below.

$$78 < f_1 \cdot Z < 90$$

$$-1.60 < f_{L2a}/D_S < -1.10$$

where
$f_1$: The focal length of the first lens group.
$Z$: Zooming ratio.
$f_{L2a}$: the focal length of the surface facing the object of the second lens component of the first lens group.
$D_S$: The axial distance from the diaphragm to the plane facing the object of the second lens component of the first lens group.

11 Claims, 1 Drawing Sheet

COMPACT ZOOM LENS

BACKGROUND OF THE INVENTION

1. Field of the Invention

The present invention relates to a zoom lens of plus-minus two-group structure. More particularly, the present invention relates to a zoom lens suited for a lens shutter type 35-mm compact camera.

2. Related Background Art

In recent years, zooming has rapidly been in progress even in the field of lens shutter type compact cameras. Thus, the various products with a zoom lens mounted thereon have been provided on the market, and with the cost in view, a zoom lens of the kind which can be constructed most simply and compactly with a plus-minus two-group structure has mainly been adopted.

Recently, in particular, the specification has increasingly become higher still and there has been proposed a zoom lens including a wide angle of view of approximately 62 degrees at the wide angle edge with a zooming ratio of more than double. In Japanese Patent Laid-Open Application No. 2-50118, for example, a zoom lens including a wide angle of view of approximately 62 degrees at the wide angle end with a zooming ratio of 2.83 times is proposed.

The two-group structure zoom lens disclosed in the above-mentioned Japanese Patent Laid-Open Application No. 2-50118 satisfies the specification provided by the present invention which will be described later as far as the wide angle of view and zooming ratio of the lenses are concerned. However, in order to meet the requirements for making the entire length of the lenses as short as strongly desired, the power of each of the lens groups are intensified. As a result, the second lens group is particularly constructed with four lenses, and the back focus is made as short as 1.4 mm–0.5 mm, so that the lens diameter of the last portion becomes as great as 32 mm–36 mm. As a lens of the kind, this diameter is considerably large. Hence, there are encountered the problems set forth below in assembling cameras actually by mounting this type of lens therein.

(a) It is difficult to secure the eccentric precision because large and heavy lenses of the second lens group should be moved in zooming.

(b) The large lenses of the second lens group are positioned close to the surface of the film, and the lenses should be machined to be oblong analogous to the picture frame of the film, leading to the difficulty in centering the lenses.

(c) The film surface and the lenses of the second lens group are placed extremely close to each other, and there is a considerable possibility that dust particles and the like adhering to the lenses can easily be taken into a picture. Furthermore, the ghost due to the reflections of the faces of film and lens can easily appear.

Further, in each of the embodiments disclosed in the Japanese Patent Laid-Open Application No. 2-50118, two to three aspherical faces are used in order to improve the focusing capability, and in addition, some of them employ a floating structure for the lens movement. Accordingly, any one of them is suitably adopted as a lens for the compact camera for which a severe restriction exists in costwise.

SUMMARY OF THE INVENTION

An object of the present invention is to solve the above-mentioned problems and provide a small sized inexpensive zoom lens practically suited for a compact camera, which includes a high angle of view of approximately 62 degrees while achieving a zooming ratio of as many as 2.83 times with an excellent focusing capability.

In order to achieve the above-mentioned objectives, a zoom lens according to the present invention comprises a first lens group having the positive refractivity which relatively travels along the optical axis to change the distance between the groups for varying powers, and a second lens group having negative refractivity. The first lens group has sequentially from an object side a first positive lens component, a second negative lens component, a third lens component having positive refractivity, a fourth positive lens component, and a fifth lens component having positive refractivity, and the second lens group has sequentially form the object side a sixth positive lens component, a seventh negative lens component, and an eighth negative lens component. Further, the first lens group includes a diaphragm adjacent to the fifth lens component, and the zoom lens of the present invention is characterized in being structured to satisfy conditions given below.

$$78 < f_1 \cdot Z < 90$$

$$-1.60 < f_{L2a}/D_S < -1.10$$

where, $f_1$: The focal length of the first lens group.

$Z$: Zooming ratio.

$f_{L2a}$: The focal length of the surface facing the object of the second lens component of the first lens group.

$D_S$: The axial distance from the diaphragm to the plane facing the object of the second lens component of the first lens group.

With a structure such as above, it is possible to achieve obtaining a compact zoom lens having an excellent focusing capability in the entire region of variable powers while making the lens systems compact with the inclusion of the angle of view of approximately 62 degrees and the zooming ratio of as many as 2.83 times.

In this respect, it is preferable to structure the second lens group to satisfy the conditions given below in order to make the lens systems more compact.

$$65 < |f_2 \cdot Z| < 85$$

$$3.0 < \beta_{2T} < 3.7$$

where, $f_2$: The focal length of the second lens group.

$\beta_{2T}$: The magnifying power of the second lens group at the telescopic end.

The further objectives, features, and effects of the present invention will become more apparent by reference to the detailed description set forth below in conjunction with the accompanying drawing.

DESCRIPTION OF THE PREFERRED EMBODIMENTS

Figure 1:
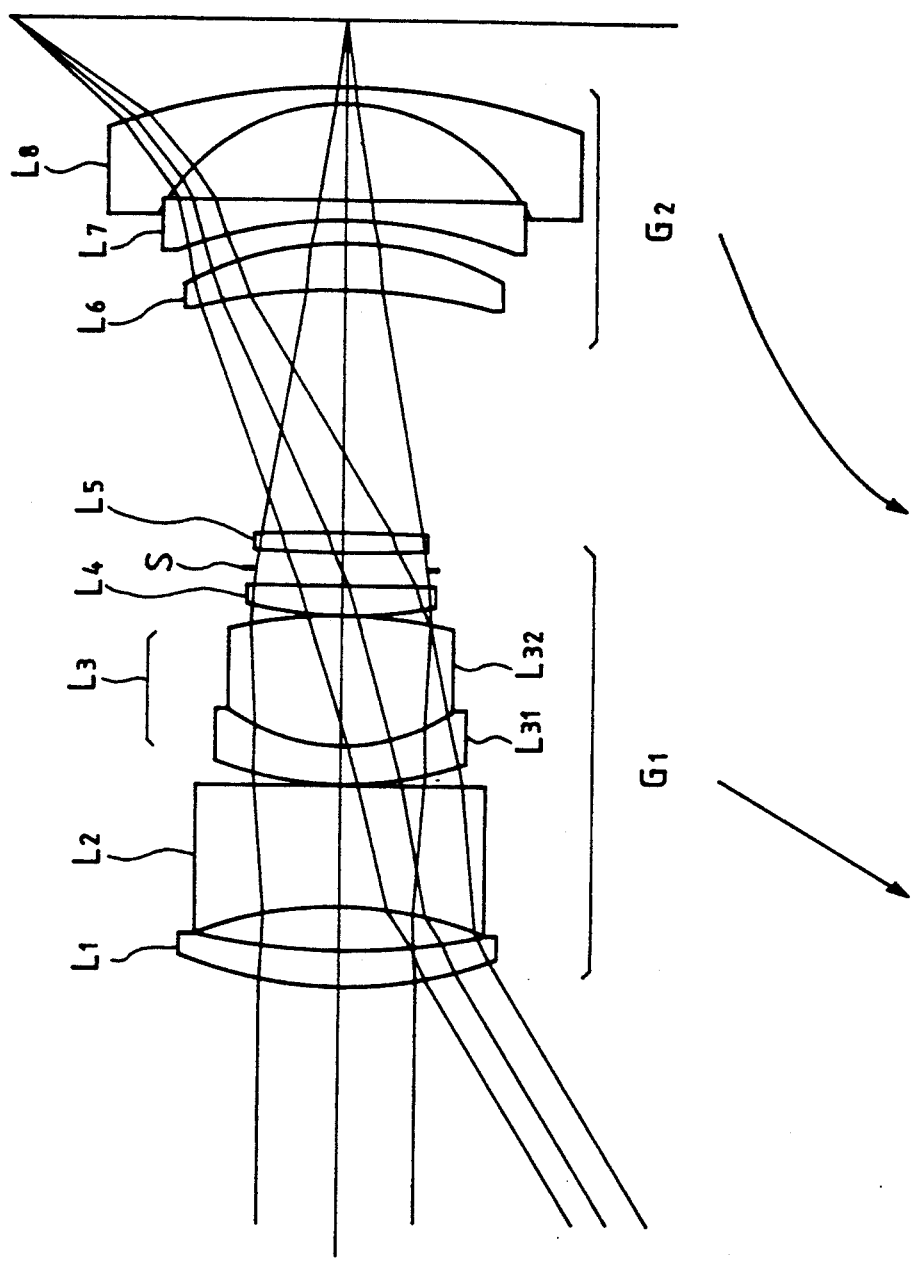
FIG. 1 is a structural view schematically showing the arrangement and optical path at the wide angle end of a first embodiment to seventh embodiment.

Hereinafter, the embodiments according to the present invention will be described in detail in conjunction with the accompanying drawing.

As shown in the FIGURE, each of the embodiments according to the present invention is all structured with a first lens group $G_1$ having positive refractivity and a second lens group $G_2$ having negative refractivity, which are arranged to move relatively along the optical axis to change the distance between the first and second lens group $G_1$ and $G_2$ to perform the power variation.

The first lens group $G_1$ comprises sequentially from the object side a first lens component $L_1$ having positive refractivity, a second lens component $L_2$ having negative refractivity, a third lens component $L_3$ having positive refractivity, a fourth lens component $L_4$ having positive refractivity, and a fifth lens component $L_5$ having positive refractivity. A diaphragm S is adjacent to the fifth lens component $L_5$, i.e., between the fourth lens component $L_4$ and fifth lens component $L_5$.

In this respect, the third lens components $L_3$ and fifth lens component $L_5$ may be structured so as to have weak refractivities.

The second lens group $G_2$ comprises sequentially from the object side a sixth lens component $L_6$ having positive refractivity, a seventh lens component $L_7$ having negative refractivity, and an eighth lens component $L_8$ also having negative refractivity.

Now, when a zoom lens of a two-group structure such as the present invention is constructed, it is necessary to implement a miniaturization as much as possible for its application to a compact camera. To this end, each of the lens groups should be structured so that the refractivity thereof is fairly intensified. As a result, it becomes extremely difficult to correct the Petzval's sum, the fluctuation of every aberration accompanying the variable powers, the variation of every aberration accompanying the angles of view, and the like. Also, among those corrections required, there is particularly a problem as regards the way to solve the positively curving aberration and image curvature to be generated at the wide angle end.

In order to solve these problems with a desirable balance, the first lens group $G_1$ should be structured to satisfy the conditions given below.

$$78 < f_1 \cdot Z < 90 \quad (1)$$

$$-1.60 < f_{L2a}/D_s < -1.10 \quad (2)$$

where
$f_1$: The focal length of the first lens group $G_1$.
$Z$: The zooming ratio.
$F_{L2a}$: The focal length of the surface facing the object of the second lens component $L_2$ of the first lens group $G_1$.
$D_S$: The axial distance from the diaphragm to the surface facing the object of the second lens component $L_2$ of the first lens group $G_1$.

The conditions (1) and (2) are those required for constructing the lens systems compactly while maintaining an excellent focusing capability. The condition (1) relates to the relationship between the zooming ratio and the first lens group $G_1$, and the condition (2) relates mainly to the correction of curving aberration.

If the power of the first lens group $G_1$ exceeds the upper limit of the condition (1) and becomes small as compared with the zooming ratio, the magnifying power taken by the second lens group $G_2$ becomes small. Although this is advantageous in correcting aberration, the back focus also becomes short. Accordingly, the diameter of the second lens group $G_2$ becomes greater and the total length of the lenses becomes longer to make the lens systems inevitably large. As a result, it is impossible to arrange the lens systems compactly. Also, in the case where the zooming ratio exceeds the upper limit of the condition (1) and is great as compared with the focal length of the first lens group $G_1$, the brightness at the telescopic end becomes insufficient making it difficult to correct spherical aberration.

On the contrary, if the focal length of the first lens group $G_1$ exceeds the lower limit of the condition (1) and becomes short as compared with the zooming ratio, the magnifying power used by the second lens group $G_2$ becomes great. Therefore, the brightness of the first lens group $G_1$ becomes insufficient to make it difficult to correct spherical abberration, and also it becomes difficult to correct this in the second lens group $G_2$ because the frame aberration and the variation due to the angle of view on the image surface become greater. Also, in the case where the zooming ratio exceeds the lower limit of the condition (1) and becomes small as compared with the focal length of the first lens group $G_1$, the optical systems become great as compared with the specification of the lens systems.

The condition (2) relates to the positive distortion at the wide angle end. As described earlier, in the zooming type according to the present invention, a large positive distortion takes place in the second lens group $G_2$ essentially. To offset this, a negative distortion is generated in the first lens group $G_1$ so as to obtain a desirable curvature as a whole.

In the present invention, the positive lens of the first lens component $L_1$ is of a meniscus type, and the positive distortion generated by this first lens component $L_1$ is controlled as much as possible. Then, on the second lens component $L_2$ facing the object, i.e., the location as far from the diaphragm as possible, a surface having the negative power is provided to generate the negative distortion, so that the distortion can be well balanced for correction as a whole.

This condition (2) regulates the plane power of the concave surface of the second lens component $L_2$ facing the object as well as its position from the diaphragm S. The negative distortion generated on the surface of the second lens component $L_2$ becomes too small in its amount below the lower limit of the condition (2) to be able to offset the great positive distortion to be generated by the second lens group $G_2$ any more.

On the contrary, the negative power on the surface of the second lens component $L_2$ facing the object becomes too great above the upper limit of the condition (2). In this case, the negative distortion generated on the surface of the second lens component $L_2$ facing the object is increased, and even if the positive distortion generated by the second lens group $G_2$ can be offset by this negative aberration, an asymmetric component of the coma aberration or sagittal coma is generated to make the correction of these aberrations difficult. Also, in such a case, the length from the diaphragm S to the surface of the second lens component $L_2$ becomes long, and the axial thickness of the lens is increased to make the lens systems undesirably large.

Also, in order to structure the lens systems compactly and correct the curving aberrations desirably, it is preferable to construct the first lens group $G_1$ to satisfy the conditions (1) and (2). Then, it is further preferable to structure the second lens group $G_2$ to satisfy the conditions given below.

$$65 < |f_2 \cdot Z| < 90 \tag{3}$$

$$3.0 < \beta_{2T} < 3.7 \tag{4}$$

where, $f_2$: The focal length of the second lens group $G_2$.
$\beta_{2T}$: The magnifying power of the second lens group $G_2$ at the telescopic end.

The condition (3) relates to the relationship between the zooming ratio and the second lens group $G_2$, and the condition (4) relates to the magnifying power borne by the second lens group $G_2$.

If the power of the second lens group $G_2$ exceeds the upper limit of the condition (3) and becomes weak as compared with the zooming ratio, the total length of the lenses becomes great. Accordingly, the required amount of movement for the second lens group $G_2$ should undesirably become great by the variable powers relatively. Also, in the case where the zooming ratio exceeds the upper limit of the condition (3) and becomes great as compared with the focal length of the second lens group $G_2$, it is necessary for the second lens group $G_2$ to bear a high magnifying power, thus generating the asymmetric component of the coma aberration and the curvature of the image plane and distortion due to the angle of view. It is difficult to correct them.

On the contrary, if the power of the second lens group $G_2$ exceeds the lower limit of the condition (3) and becomes great as compared with the zooming ratio, the required mount of movement for the second lens group $G_2$ by the variable power is small and the total length of the lenses becomes short. However, the back focus becomes short to result undesirably in the greater diameter of the lenses of the second lens group $G_2$. Also, in the case where the zooming ratio exceeds the lower limit of the condition (3) and becomes small as compared with the focal length of the second lens group $G_2$, the optical systems become great as compared with the specification of the lens systems.

Also, if the second lens group $G_2$ exceeds the upper limit of the condition (4), the magnifying power for the second lens group $G_2$ to bear becomes great, and the structure of the first lens group $G_1$ should be arranged to generate a great power. As a result, it becomes difficult to secure brightness, and the freedom provided by the current three-lens structure for the second lens group $G_2$ for correcting the aberration becomes insufficient to generate the asymmetric component of a coma, and the variation of the image plane and distortion due to the angle of view. Then, it becomes difficult to correct them.

On the contrary, the magnifying power borne by the second lens group $G_2$ becomes small below the lower limit of the condition (4) to make the back focus short at the wide angle end. Hence, the diameter of the lenses of the second lens group $G_2$ should undesirably be made large.

Subsequently, the specific description will be made of the structure of the present embodiment according to the present invention in conjunction with the accompanying drawing.

As shown in the figure, the first lens group $G_1$ comprises the first lens (first lens component) $L_1$ which is a positive meniscus lens having its convex surface towards the object, the second lens (second lens component) $L_2$ which is a negative meniscus lens having a more intensified concave surface towards the object with a great axial thickness, the biconvex third lens (third lens component) $L_3$ having a positive refractivity as a whole consisting of a negative meniscus lens $L_{31}$ with its convex surface towards the object, and a positive biconvex lens $L_{32}$ connected thereto, the positive fourth lens (fourth lens component) $L_4$, and the positive fifth lens (fifth lens component) $L_5$.

Then, the second lens group $G_2$ comprises the sixth lens (sixth lens component) $L_6$ which is a positive meniscus lens having its convex surface towards the image, the seventh lens (seventh lens component) $L_7$ which is a negative meniscus lens having a more intensified concave surface towards the object, and the eighth lens (eighth lens component) $L_8$ which is also a negative meniscus lens having a more intensified concave surface towards the object.

In each of the embodiments, each lens group is moved together to contact the air space between the first lens group $G_1$ and second lens group $G_2$ for the variable powers from the wide angle end to the telescopic end.

Also, the diaphragm S is adjacent the fifth lens $L_5$, i.e., between the fourth lens component $L_4$ and fifth lens component $L_5$ in each of the embodiments. In this respect, it may be possible to construct the third lens component $L_3$ and fifth lens component $L_5$ of the first lens group $G_1$ with a weak negative refractivity.

As the above describes, the second lens group $G_2$ is structured totally with the meniscus lenses, and further, it is preferable to structure the seventh lens component $L_7$ and eighth lens component $L_8$ of the second lens group $G_2$ so as to satisfy the condition given below.

$$-1.90 < \frac{r_a + r_b}{r_a - r_b} < -1.00 \tag{5}$$

$$1.0 < f_{L8}/f_2 < 1.8 \tag{6}$$

where, $r_a$: The radius of curvature of the seventh lens component $L_7$ on the object side in the second lens group $G_2$.
$r_b$: The radius of curvature of the seventh lens component $L_7$ on the image side in the second lens group $G_2$.
$f_{L8}$: The focal length of the eighth lens component $L_8$ of the second lens group $G_2$.

The condition (5) relates to the optimum shape of the seventh lens component $L_7$ for the well balanced correction of image plane curvature. The basis of the aberration correction in the optical system is to arrange the structure so as to make the amount of aberration generated by each surface as small as possible. In the second lens group $G_2$, the light beam which forms an image in the periphery of the image plane at the wide angle end passes the furthest place from the optical axis. For a light beam of the kind, a meniscus type lens should be arranged.

Beyond the upper limit of the condition (5), the fluctuation of the image plane curvature is generated due to the angle of view. Also, the light beam which forms an image at the same image height at the wide angle end and telescopic end passes the positions in the seventh lens component $L_7$ which are extremely different from each other, thus making it impossible to take an aberration balance accompanying the variable powers. On the contrary, beyond the lower limit of the condition (5), the intensified curvature of the concave surface of the seventh lens component facing the object becomes an intensified meniscus type and the principal point position of this lens component is caused to move towards the object side. As a result, it becomes difficult to secure the back focus, necessitating a larger diameter of the lenses of the second lens group $G_2$. Hence, a compact lens system cannot be implemented.

The condition (6) relates to the correction of the positive distortion generated particularly at the wide angle end. Beyond the upper limit of the condition (6), the power of the eighth lens component $L_8$ in the second lens group $G_2$ becomes small. Therefore, it is necessary to intensify the powers of the sixth lens component $L_6$ and seventh lens component $L_7$ to enable them to bear the greater power. As a result, the fluctuation is increased by the variation of the view angle of the image curvature and the variable power of the image curvature. Furthermore, the asymmetric component of the coma aberration is also increased.

Beyond the lower limit of the condition (6), the power of the eighth lens component $L_8$ is intensified to generate the positive distortion at the wide angle end, and it becomes difficult to correct this aberration.

Now, a zoom lens according to the present invention has a focal length of as long as 102 mm at the telescopic side in terms of the film size of 35 mm (Leika size). At a telescopic side such as this, it becomes difficult to correct color aberration, particularly the color aberration of the magnifying powers.

Therefore, in order to achieve a well balanced correction of the color aberration at the telescopic side, it is preferable to satisfy the conditions given below.

$$40 < \nu_{L8} < 70 \quad (7)$$
$$35 < \nu_{L1} < 61 \quad (8)$$
$$32 < \nu_{L6} < 50 \quad (9)$$
$$2.5 < \frac{r_c + r_d}{r_c - r_d} < 5.2 \quad (10)$$

where, $\nu_{L1}$: The Abbe's number of L1 lens components
$r_c$: The radius of the curvature of the sixth lens component $L_6$ facing the object.
$r_d$: The radius of the curvature of the sixth lens component $L_6$ facing the image.

The conditions (7) and (8) relate to the implementation of the color aberration of the magnifying power and the axial color aberration. A zoom lens according to the present invention should be constructed with each of the lens groups having fairly intensified powers in order to achieve the high variable powers and miniaturization. In the second lens group $G_2$, therefore, a curving is generated in the positive direction of the color aberration of the magnifying power. To correct this, it is necessary to construct the eighth lens component $L_8$ with a low dispersive nitric material.

The condition (7) relates to the restriction on the range of the optimum Abbe's numbers of the eighth lens component $L_8$. The upper limit of the condition (7) is defined automatically by the nitric material currently available because the eight lens component $L_8$ is a negative lens for which no nitric material of low refraction factor can be used and the material used should have a refraction factor of 1.5 or more. On the contrary, the lower limit of the condition (7) is defined in consideration of the fact that although a material of a high refraction factor is easily obtainable, if the eighth lens component $L_8$ exceeds this lower limit, its Abbe's number becomes highly dispersive to generate a great curving in the direction of the color aberration of the magnifying power at the wide angle end. Then, it becomes impossible to correct this aberration.

The condition (8) relates to the implementation of a desirable correction of an axial color aberration under the condition (7). Beyond the limit of the condition (7), the fluctuation of the axial color aberration becomes undesirably great at the wide angle end and telescopic end.

The conditions (9) and (10) relates to the further complement of the condition (8). The dispersive value of a glass material is automatically limited, and according to the objective specification of the present invention, there remains a curving in the positive direction of the color aberration of the magnifying power at the wide angle end. Thus, in order to offset this, the positive lens of the sixth lens component $L_6$ is caused to generate the color aberration of the negative magnifying power. To this end, the conditions (9) and (10) impose restriction upon the range of the optimum Abbe's number and optimum shape taken by the sixth lens component $L_6$.

Beyond the limit of the condition (9), it becomes difficult to correct the axial color aberration and color aberration of the magnifying power in a desirable balance. Beyond the upper limit of the condition (10), although there is no hindrance in correcting the color aberration of the magnifying power, the spherical aberration becomes too great at the telescopic end to be corrected sufficiently. Therefore, it becomes impossible to obtain a desirable performance because of the inability to correct this spherical aberration. On the contrary, beyond the lower limit of the condition (10), a curving in the positive direction of the color aberration of the magnifying power becomes great particularly at the wide angle end. A positive image curvature is also generated, and it becomes difficult to correct them.

Now, every item in each of the embodiments according to the present invention is mentioned in the tables 1 to 7 given below.

In the tables 1 to 7 given below, the numerals in the left-hand side represents the sequence from the object side, and the reference mark r designates the radius of the curvature; d, the distance between lenses; $\nu$, the Abbe's number; n, the refraction factor at d line ($\lambda = 587.6$ nm); f, the focal length in the entire system; $F_{NO}$, F number; and $2\omega$, the angle of view (°). Also, in the table 8, the numerical tables corresponding to the conditions for each of the embodiments according to the present invention are mentioned.

TABLE 1

(Embodiment 1)
$f = 36.0 \sim 102.0, F_{NO} = 3.7 \sim 10.1, 2\omega = 61.2 \sim 24.0$

| | r | d | v | n |
|---|---|---|---|---|
| 1 | 29.200 | 2.30 | 38.1 | 1.60342 |
| 2 | 42.497 | 2.90 | | |
| 3 | −23.729 | 7.90 | 43.3 | 1.84042 |
| 4 | −4198.277 | 0.20 | | |
| 5 | 24.144 | 2.40 | 40.9 | 1.79631 |
| 6 | 12.587 | 8.40 | 59.7 | 1.53996 |
| 7 | −29.020 | 0.20 | | |
| 8 | 33.777 | 1.80 | 70.1 | 1.51860 |
| 9 | −240.696 | 0.96 | | |

TABLE 1-continued (Embodiment 1)

$f = 36.0 \sim 102.0$, $F_{NO} = 3.7 \sim 10.1$, $2\omega = 61.2 \sim 24.0$

| | r | d | ν | n |
|---|---|---|---|---|
| 10 | Diaphragm | 1.20 | | |
| 11 | 213.500 | 1.20 | 56.5 | 1.50137 |
| 12 | −121.178 | (d12) | | |
| 13 | −43.617 | 3.00 | 45.4 | 1.79668 |
| 14 | −21.917 | 1.65 | | |
| 15 | −30.547 | 1.20 | 46.4 | 1.80411 |
| 16 | −800.000 | 6.30 | | |
| 17 | −13.485 | 1.20 | 67.9 | 1.59319 |
| 18 | −43.080 | (B.f) | | |
| f | 36.000 | 55.000 | 102.000 | |
| d12 | 15.561 | 8.047 | 1.488 | |
| B.f | 4.330 | 22.019 | 65.778 | |

TABLE 2

(Embodiment 2)

$f = 36.0 \sim 102.0$, $F_{NO} = 3.6 \sim 10.1$, $2\omega = 61.3 \sim 24.1$

| | r | d | ν | n |
|---|---|---|---|---|
| 1 | 25.467 | 2.30 | 38.1 | 1.60342 |
| 2 | 33.563 | 2.90 | | |
| 3 | −23.825 | 7.90 | 43.3 | 1.84042 |
| 4 | −4198.277 | 0.20 | | |
| 5 | 21.724 | 2.40 | 40.9 | 1.79631 |
| 6 | 11.409 | 8.40 | 59.7 | 1.53996 |
| 7 | −26.896 | 0.20 | | |
| 8 | 32.447 | 1.80 | 64.1 | 1.51680 |
| 9 | 622.280 | 0.49 | | |
| 10 | Diaphragm | 1.00 | | |
| 11 | 213.500 | 1.20 | 56.5 | 1.50137 |
| 12 | −121.176 | (d12) | | |
| 13 | −26.605 | 3.00 | 45.4 | 1.79668 |
| 14 | −16.928 | 2.50 | | |
| 15 | −18.000 | 1.40 | 47.5 | 1.78797 |
| 16 | −60.783 | 5.30 | | |
| 17 | −14.524 | 1.55 | 60.3 | 1.62041 |
| 18 | −34.830 | (B.f) | | |
| f | 36.000 | 55.000 | 102.000 | |
| d12 | 16.984 | 9.470 | 2.910 | |
| B.f | 2.895 | 20.585 | 64.344 | |

TABLE 3

(Embodiment 3)

$f = 36.0 \sim 102.0$, $F_{NO} = 3.7 \sim 10.1$, $2\omega = 60.5 \sim 24.0$

| | r | d | ν | n |
|---|---|---|---|---|
| 1 | 21.454 | 2.30 | 38.1 | 1.60342 |
| 2 | 28.074 | 2.90 | | |
| 3 | −22.902 | 4.00 | 43.3 | 1.84042 |
| 4 | −3925.728 | 0.20 | | |
| 5 | 24.590 | 2.40 | 40.9 | 1.79631 |
| 6 | 11.924 | 8.40 | 59.7 | 1.53996 |
| 7 | −24.711 | 0.20 | | |
| 8 | 29.138 | 1.80 | 64.1 | 1.51680 |
| 9 | 134.859 | 1.00 | | |
| 10 | Diaphragm | 1.20 | | |
| 11 | 213.500 | 1.20 | 56.5 | 1.50137 |
| 12 | −53.768 | (d12) | | |
| 13 | −31.571 | 2.50 | 45.4 | 1.79668 |
| 14 | −19.283 | 2.50 | | |
| 15 | −22.308 | 1.20 | 47.5 | 1.78797 |
| 16 | −161.557 | 6.00 | | |
| 17 | −13.533 | 1.20 | 60.3 | 1.62041 |
| 18 | −27.908 | (B.f) | | |
| f | 36.000 | 55.000 | 102.000 | |
| d12 | 15.391 | 7.878 | 1.318 | |
| B.f | 3.156 | 20.846 | 64.604 | |

TABLE 4

(Embodiment 4)

$f = 36.0 \sim 102.0$, $F_{NO} = 3.7 \sim 10.2$, $2\omega = 62.0 \sim 24.1$

| | r | d | ν | n |
|---|---|---|---|---|
| 1 | 27.340 | 2.50 | 60.3 | 1.62041 |

TABLE 4-continued (Embodiment 4)

$f = 36.0 \sim 102.0$, $F_{NO} = 3.7 \sim 10.2$, $2\omega = 62.0 \sim 24.1$

| | r | d | ν | n |
|---|---|---|---|---|
| 2 | 39.977 | 2.80 | | |
| 3 | −24.269 | 8.10 | 44.7 | 1.80218 |
| 4 | −5000.000 | 0.20 | | |
| 5 | 30.712 | 2.50 | 40.9 | 1.79631 |
| 6 | 11.939 | 8.10 | 54.0 | 1.61720 |
| 7 | −67.221 | 0.30 | | |
| 8 | 43.816 | 2.25 | 70.1 | 1.51860 |
| 9 | −34.679 | 1.44 | | |
| 10 | Diaphragm | 0.60 | | |
| 11 | 213.500 | 1.20 | 47.1 | 1.67003 |
| 12 | −200.174 | (d12) | | |
| 13 | −49.391 | 3.00 | 33.9 | 1.80384 |
| 14 | −21.897 | 1.50 | | |
| 15 | −27.898 | 1.20 | 47.5 | 1.78797 |
| 16 | −2575.489 | 5.80 | | |
| 17 | −14.526 | 1.20 | 40.9 | 1.79631 |
| 18 | −32.852 | (B.f) | | |
| f | 36.000 | 55.000 | 102.000 | |
| d12 | 16.066 | 8.552 | 1.992 | |
| B.f | 4.397 | 22.086 | 65.845 | |

TABLE 5

(Embodiment 5)

$f = 36.0 \sim 102.0$, $F_{NO} = 3.6 \sim 10.1$, $2\omega = 62.0 \sim 24.0$

| | r | d | ν | n |
|---|---|---|---|---|
| 1 | 24.146 | 2.30 | 47.1 | 1.62374 |
| 2 | 32.639 | 2.90 | | |
| 3 | −23.056 | 5.00 | 46.4 | 1.80411 |
| 4 | −5000.000 | 0.20 | | |
| 5 | 22.108 | 2.40 | 40.9 | 1.79631 |
| 6 | 11.333 | 8.40 | 59.7 | 1.53996 |
| 7 | −24.703 | 0.20 | | |
| 8 | 32.101 | 1.80 | 64.1 | 1.51680 |
| 9 | 622.280 | 1.00 | | |
| 10 | Diaphragm | 1.20 | | |
| 11 | 213.500 | 1.20 | 56.5 | 1.50137 |
| 12 | −117.308 | (d12) | | |
| 13 | −25.991 | 2.80 | 40.9 | 1.79631 |
| 14 | −17.546 | 2.50 | | |
| 15 | −21.798 | 1.40 | 47.5 | 1.78797 |
| 16 | −77.155 | 5.30 | | |
| 17 | −13.772 | 1.55 | 54.0 | 1.71300 |
| 18 | −29.443 | (B.f) | | |
| f | 36.000 | 55.000 | 102.000 | |
| d12 | 14.825 | 7.311 | 0.751 | |
| B.f | 3.099 | 20.788 | 64.547 | |

TABLE 6

(Embodiment 6)

$f = 36.0 \sim 102.0$, $F_{NO} = 3.7 \sim 10.1$, $2\omega = 60.3 \sim 24.0$

| | r | d | ν | n |
|---|---|---|---|---|
| 1 | 23.173 | 2.25 | 38.1 | 1.60342 |
| 2 | 33.431 | 2.80 | | |
| 3 | −23.168 | 3.90 | 43.3 | 1.84042 |
| 4 | −3790.358 | 0.20 | | |
| 5 | 26.015 | 2.30 | 40.9 | 1.79631 |
| 6 | 12.010 | 8.10 | 59.7 | 1.53996 |
| 7 | −27.661 | 0.20 | | |
| 8 | 31.305 | 1.75 | 64.1 | 1.51680 |
| 9 | 165.837 | 0.97 | | |
| 10 | Diaphragm | 1.20 | | |
| 11 | 206.138 | 1.20 | 70.1 | 1.51860 |
| 12 | −37.741 | (d12) | | |
| 13 | −32.510 | 2.30 | 39.6 | 1.80454 |
| 14 | −20.189 | 2.30 | | |
| 15 | −28.627 | 1.20 | 47.5 | 1.78797 |
| 16 | −354.033 | 5.60 | | |
| 17 | −12.899 | 1.20 | 60.3 | 1.62041 |
| 18 | −35.195 | (B.f) | | |
| f | 36.000 | 55.000 | 102.001 | |
| d12 | 14.113 | 7.396 | 1.532 | |

TABLE 6-continued (Embodiment 6)
f = 36.0~102.0, $F_{NO}$ = 3.7~10.1, 2ω = 60.3~24.0

| | r | d | ν | n |
|---|---|---|---|---|
| B.f | 4.785 | 21.749 | 63.714 | |

TABLE 7

(Embodiment 7)
f = 36.0~102.0, $F_{NO}$ = 3.5~10.1, 2ω = 60.1~24.0

| | r | d | ν | n |
|---|---|---|---|---|
| 1 | 27.343 | 2.40 | 47.1 | 1.62374 |
| 2 | 37.529 | 3.10 | | |
| 3 | −25.763 | 5.35 | 46.4 | 1.80411 |
| 4 | −3027.536 | 0.20 | | |
| 5 | 23.686 | 2.55 | 40.9 | 1.79631 |
| 6 | 12.077 | 9.00 | 59.7 | 1.53996 |
| 7 | −33.980 | 0.20 | | |
| 8 | 42.389 | 1.90 | 64.1 | 1.51680 |
| 9 | 9484.102 | 1.05 | | |
| 10 | Diaphragm | 1.25 | | |
| 11 | 228.224 | 1.25 | 56.5 | 1.50137 |
| 12 | −48.239 | (d12) | | |
| 13 | −33.349 | 2.50 | 46.4 | 1.80411 |
| 14 | −20.377 | 2.70 | | |
| 15 | −22.978 | 1.20 | 47.5 | 1.78797 |
| 16 | −180.375 | 6.50 | | |
| 17 | −14.675 | 1.20 | 60.3 | 1.62041 |
| 18 | −28.229 | (B.f) | | |
| f | 36.000 | 55.000 | 102.000 | |
| d12 | 17.874 | 9.099 | 1.437 | |
| B.f | 1.012 | 19.092 | 63.818 | |

TABLE 8

(Values for Each Condition)

| | Embodiments | | | |
|---|---|---|---|---|
| | 1 | 2 | 3 | 4 |
| $f_1 \cdot Z$ | 82.157 | 82.157 | 82.157 | 82.157 |
| $|f_2 \cdot Z|$ | 76.491 | 76.491 | 76.491 | 76.491 |
| $\beta_{2T}$ | 3.517 | 3.517 | 3.517 | 3.517 |
| $\dfrac{r_a + r_b}{r_a - r_b}$ | −1.079 | −1.841 | −1.320 | −1.022 |
| $f_{L8}/f_2$ | 1.244 | 1.532 | 1.620 | 1.247 |
| $f_{L2a}/D_S$ | −1.292 | −1.325 | −1.419 | −1.322 |
| $\nu_{L8}$ | 67.871 | 60.140 | 60.140 | 40.897 |
| $\nu_{L1}$ | 38.027 | 38.027 | 38.027 | 60.140 |
| $\nu_{L6}$ | 45.372 | 45.372 | 45.372 | 33.916 |
| $\dfrac{r_c + r_d}{r_c - r_d}$ | 3.020 | 4.498 | 4.138 | 2.593 |

| | Embodiments | | |
|---|---|---|---|
| | 5 | 6 | 7 |
| $f_1 \cdot Z$ | 82.157 | 79.320 | 87.820 |
| $|f_2 \cdot Z|$ | 76.491 | 70.830 | 83.570 |
| $\beta_{2T}$ | 3.517 | 3.643 | 3.290 |
| $\dfrac{r_a + r_b}{r_a - r_b}$ | −1.788 | −1.176 | −1.292 |
| $f_{L8}/f_2$ | 1.402 | 1.340 | 1.729 |
| $f_{L2a}/D_S$ | −1.509 | −1.583 | −1.244 |
| $\nu_{L8}$ | 53.925 | 60.290 | 60.290 |
| $\nu_{L1}$ | 47.103 | 38.120 | 47.070 |
| $\nu_{L6}$ | 40.897 | 39.590 | 46.430 |
| $\dfrac{r_c + r_d}{r_c - r_d}$ | 5.155 | 4.277 | 4.142 |

From the values of every item for each of the embodiments mentioned in the above-mentioned tables 1 to 7, it is clear that each of the embodiments enables the lens systems to be compactly constructed in spite of the inclusion of the wide angle of view of approximately 62 degrees with the zooming ratio of as many times as 2.83.

According to the present invention as set forth above, while implementing the miniaturization of the lens systems, it is possible to achieve a compact zoom lens capable of forming a desirable image in every range of variable powers including an angle of view of approximately 62 degrees and a zooming ratio of 2.83 times.

What is claimed is:

1. A zoom lens comprising a first lens group having positive refractivity, and a second lens group having negative refractivity, and performing its power variation by varying the distance between the groups of said first lens group and second lens group, wherein
said first lens group has sequentially from the object side a first positive lens component, a second negative lens component, a third lens component having positive refractivity, a fourth positive lens component, and a fifth lens component having positive refractivity,
said the second lens group has sequentially form the object side a sixth positive lens component, a seventh negative lens component, and an eighth negative lens component, and
said first lens group includes a diaphragm adjacent to the fifth lens component, and is structured to satisfy conditions given below:

$$78 < f_1 \cdot Z < 90$$

$$-1.60 < f_{L2a}/D_S < -1.10$$

where, $f_1$: The focal length of the first lens group.
Z: Zooming ratio.
$f_{L2a}$: The focal length of the surface of the second lens component on the object side in the first lens group.
$D_S$: The axial distance from the diaphragm to the second lens component on the object side in the first lens group.

2. A zoom lens according to claim 1, wherein given the focal length of said second lens group as $f_2$, the zoom ratio as Z, and the magnifying power of the second lens group at the telescopic end as $\beta_{2T}$, the second lens group is constructed to satisfy the conditions given below $$65 < |f_2 Z| < 85$$

$$3.0 < \beta_{2T} < 3.7.$$

3. A zoom lens according to claim 2, wherein said first lens component of said first lens group is formed to be of a positive meniscus type having its convex surface towards the object, said second lens component is formed to be of a negative meniscus type having a great axial thickness and a more intensified concave surface towards the object, said third lens component, said fourth lens component, and said fifth lens component are structured to have positive refractivities respectively, and said sixth lens component of said second lens group is formed to be of a positive meniscus type having its convex surface towards the image, said seventh lens component and said eighth lens component are respectively formed to be of a negative meniscus type having a more intensified concave surface towards the object, and further said seventh lens component and said eighth lens component are structured to satisfy the condition given below:

$$-1.90 < \frac{r_a + r_b}{r_a - r_b} < -1.00$$

$$1.0 < f_{L8}/f_2 < 1.8$$

where,
$r_a$: The radius of curvature of the seventh lens component on the object side in the second lens group,
$r_b$: The radius of curvature of the seventh lens component on the image side in the second lens group,
$f_{L8}$: The focal length of the eighth lens component in the second lens group,
$f_2$: The focal length of the second lens group.

4. A zoom lens according to claim 3, wherein said first lens component of the first lens group and said sixth lens component and eighth lens component of the second lens group are structured to satisfy the conditions given below:

$$40 < \nu_{L8} < 70$$
$$35 < \nu_{L1} < 61$$
$$32 < \nu_{L6} < 50$$

$$2.5 < \frac{r_c + r_d}{r_c - r_d} < 5.2$$

where,
$\nu_{L1}$: The Abbe's number of the first lens component of the first lens group,
$\nu_{L6}$: The Abbe's number of the sixth lens component of the second lens group,
$\nu_{L8}$: The Abbe's number of the eighth lens component of the second lens group,
$r_c$: The radius of the curvature of the sixth component on the object side in the second lens group,
$r_d$: The radius of the curvature of the sixth lens component on the image side in the second lens group.

5. A zoom lens according to claim 1, wherein said zoom lens is constructed in accordance with the data given below:

| $f = 36.0 \sim 102.0$, $F_{NO} = 3.7 \sim 10.1$, $2\omega = 61.2 \sim 24.0$ | | | |
|---|---|---|---|
| r | d | $\nu$ | n |
| 1 | 29.200 | 2.30 | 38.1 | 1.60342 |
| 2 | 42.497 | 2.90 | | |
| 3 | −23.729 | 7.90 | 43.3 | 1.84042 |
| 4 | −4198.277 | 0.20 | | |
| 5 | 24.144 | 2.40 | 40.9 | 1.79631 |
| 6 | 12.587 | 8.40 | 59.7 | 1.53996 |
| 7 | −29.020 | 0.20 | | |
| 8 | 33.777 | 1.80 | 70.1 | 1.51860 |
| 9 | −240.696 | 0.96 | | |
| 10 | Diaphragm | 1.20 | | |
| 11 | 213.500 | 1.20 | 56.5 | 1.50137 |
| 12 | −121.178 | (d12) | | |
| 13 | −43.617 | 3.00 | 45.4 | 1.79668 |
| 14 | −21.917 | 1.65 | | |
| 15 | −30.547 | 1.20 | 46.4 | 1.80411 |
| 16 | −800.000 | 6.30 | | |
| 17 | −13.485 | 1.20 | 67.9 | 1.59319 |
| 18 | −43.080 | (B.f) | | |
| f | 36.000 | 55.000 | 102.000 | |
| d12 | 15.561 | 8.047 | 1.488 | |
| B.f | 4.330 | 22.019 | 65.778 | | where the numerals in the left-hand side is the sequence from the object side; r, the radius of the curvature; d, the distance between lenses; $\nu$, the Abbe's number; n, the refraction factor at d line ($\lambda = 587.6$ nm); f, the focal length in the entire system; $F_{NO}$, F number; and $2\omega$, the angle of view (°).

6. A zoom lens according to claim 1, wherein said zoom lens is constructed in accordance with the data given below:

| $f = 36.0 \sim 102.0$, $F_{NO} = 3.6 \sim 10.1$, $2\omega = 61.3 \sim 24.1$ | | | |
|---|---|---|---|
| r | d | $\nu$ | n |
| 1 | 25.467 | 2.30 | 38.1 | 1.60342 |
| 2 | 33.563 | 2.90 | | |
| 3 | −23.825 | 7.90 | 43.3 | 1.84042 |
| 4 | −4198.277 | 0.20 | | |
| 5 | 21.724 | 2.40 | 40.9 | 1.79631 |
| 6 | 11.409 | 8.40 | 59.7 | 1.53996 |
| 7 | −26.896 | 0.20 | | |
| 8 | 32.447 | 1.80 | 64.1 | 1.51680 |
| 9 | 622.280 | 0.49 | | |
| 10 | Diaphragm | 1.00 | | |
| 11 | 213.500 | 1.20 | 56.5 | 1.50137 |
| 12 | −121.176 | (d12) | | |
| 13 | −26.605 | 3.00 | 45.4 | 1.79668 |
| 14 | −16.928 | 2.50 | | |
| 15 | −18.000 | 1.40 | 47.5 | 1.78797 |
| 16 | −60.783 | 5.30 | | |
| 17 | −14.524 | 1.55 | 60.3 | 1.62041 |
| 18 | −34.830 | (B.f) | | |
| f | 36.000 | 55.000 | 102.000 | |
| d12 | 16.984 | 9.470 | 2.910 | |
| B.f | 2.895 | 20.585 | 64.344 | | where the numerals in the left-hand side is the sequence from the object side; r, the radius of the curvature; d, the distance between lenses; $\nu$, the Abbe's number; n, the refraction factor at d line ($\lambda = 587.6$ nm) f, the focal length in the entire system; $F_{NO}$, F number; and $2\omega$, the angle of view (°).

7. A zoom lens according to claim 1, wherein said zoom lens is constructed in accordance with the data given below:

| $f = 36.0 \sim 102.0$, $F_{NO} = 3.7 \sim 10.1$, $2\omega = 60.5 \sim 24.0$ | | | |
|---|---|---|---|
| r | d | $\nu$ | n |
| 1 | 21.454 | 2.30 | 38.1 | 1.60342 |
| 2 | 28.074 | 2.90 | | |
| 3 | −22.902 | 4.00 | 43.3 | 1.84042 |
| 4 | −3925.728 | 0.20 | | |
| 5 | 24.590 | 2.40 | 40.9 | 1.79631 |
| 6 | 11.924 | 8.40 | 59.7 | 1.53996 |
| 7 | −24.711 | 0.20 | | |
| 8 | 29.138 | 1.80 | 64.1 | 1.51680 |
| 9 | 134.859 | 1.00 | | |
| 10 | Diaphragm | 1.20 | | |
| 11 | 213.500 | 1.20 | 56.5 | 1.50137 |
| 12 | −53.768 | (d12) | | |
| 13 | −31.571 | 2.50 | 45.4 | 1.79668 |
| 14 | −19.283 | 2.50 | | |
| 15 | −22.308 | 1.20 | 47.5 | 1.78797 |
| 16 | −161.557 | 6.00 | | |
| 17 | −13.533 | 1.20 | 60.3 | 1.62041 |
| 18 | −27.908 | (B.f) | | |
| f | 36.000 | 55.000 | 102.000 | |
| d12 | 15.391 | 7.878 | 1.318 | |
| B.f | 3.156 | 20.846 | 64.604 | | where the numerals in the left-hand side is the sequence from the object side; r, the radius of the curvature; d, the distance between lenses; $\nu$, the Abbe's number; n, the refraction factor at d line ($\lambda = 587.6$ nm); f, the focal length in the entire system; $F_{NO}$, F number; and $2\omega$, the angle of view (°).

8. A zoom lens according to claim 1, wherein said zoom lens is constructed in accordance with the data given below:

| f = 36.0~102.0, F_NO = 3.7~10.2, 2ω = 62.0~24.1 | | | |
|---|---|---|---|
| | r | d | ν | n |
| 1 | 27.340 | 2.50 | 60.3 | 1.62041 |
| 2 | 39.977 | 2.80 | | |
| 3 | −24.269 | 8.10 | 44.7 | 1.80218 |
| 4 | −5000.000 | 0.20 | | |
| 5 | 30.712 | 2.50 | 40.9 | 1.79631 |
| 6 | 11.939 | 8.10 | 54.0 | 1.61720 |
| 7 | −67.221 | 0.30 | | |
| 8 | 43.816 | 2.25 | 70.1 | 1.51860 |
| 9 | −34.679 | 1.44 | | |
| 10 | Diaphragm | 0.60 | | |
| 11 | 213.500 | 1.20 | 47.1 | 1.67003 |
| 12 | −200.174 | (d12) | | |
| 13 | −49.391 | 3.00 | 33.9 | 1.80384 |
| 14 | −21.897 | 1.50 | | |
| 15 | −27.898 | 1.20 | 47.5 | 1.78797 |
| 16 | −2575.489 | 5.80 | | |
| 17 | −14.526 | 1.20 | 40.9 | 1.79631 |
| 18 | −32.852 | (B.f) | | |
| f | 36.000 | 55.000 | 102.000 | |
| d12 | 16.066 | 8.552 | 1.992 | |
| B.f | 4.397 | 22.086 | 65.845 | | where the numerals in the left-hand side is the sequence from the object side; r, the radius of the curvature; d, the distance between lenses; ν, the Abbe's number; n, the refraction factor at d line (λ=587.6 nm); f, the focal length in the entire system; $F_{NO}$, F number; and 2ω, the angle of view (20 ).

9. A zoom lens according to claim 1, wherein said zoom lens is constructed in accordance with the data given below:

| f = 36.0~102.0, F_NO = 3.6~10.1, 2ω = 62.0~24.0 | | | |
|---|---|---|---|
| | r | d | ν | n |
| 1 | 24.146 | 2.30 | 47.1 | 1.62374 |
| 2 | 32.639 | 2.90 | | |
| 3 | −23.056 | 5.00 | 46.4 | 1.80411 |
| 4 | −5000.000 | 0.20 | | |
| 5 | 22.108 | 2.40 | 40.9 | 1.79631 |
| 6 | 11.333 | 8.40 | 59.7 | 1.53996 |
| 7 | −24.703 | 0.20 | | |
| 8 | 32.101 | 1.80 | 64.1 | 1.51680 |
| 9 | 622.280 | 1.00 | | |
| 10 | Diaphragm | 1.20 | | |
| 11 | 213.500 | 1.20 | 56.5 | 1.50137 |
| 12 | −117.308 | (d12) | | |
| 13 | −25.991 | 2.80 | 40.9 | 1.79631 |
| 14 | −17.546 | 2.50 | | |
| 15 | −21.798 | 1.40 | 47.5 | 1.78797 |
| 16 | −77.155 | 5.30 | | |
| 17 | −13.772 | 1.55 | 54.0 | 1.71300 |
| 18 | −29.443 | (B.f) | | |
| f | 36.000 | 55.000 | 102.000 | |
| d12 | 14.825 | 7.311 | 0.751 | |
| B.f | 3.099 | 20.788 | 64.547 | | where the numerals in the left-hand side is the sequence from the object side; r, the radius of the curvature; d, the distance between lenses; ν, the Abbe's number; n, the refraction factor at d line (λ=587.6 nm); f, the focal length in the entire system; $F_{NO}$, F number; and 2ω, the angle of view (°).

10. A zoom lens according to claim 1, wherein said zoom lens is constructed in accordance with the data given below:

| f = 36.0~102.0, F_NO = 3.7~10.1, 2ω = 60.3~24.0 | | | |
|---|---|---|---|
| | r | d | ν | n |
| 1 | 23.173 | 2.25 | 38.1 | 1.60342 |
| 2 | 33.431 | 2.80 | | |
| 3 | −23.168 | 3.90 | 43.3 | 1.84042 |
| 4 | −3790.358 | 0.20 | | |
| 5 | 26.015 | 2.30 | 40.9 | 1.79631 |
| 6 | 12.010 | 8.10 | 59.7 | 1.53996 |
| 7 | −27.661 | 0.20 | | |
| 8 | 31.305 | 1.75 | 64.1 | 1.51680 |
| 9 | 165.837 | 0.97 | | |
| 10 | Diaphragm | 1.20 | | |
| 11 | 206.138 | 1.20 | 70.1 | 1.51860 |
| 12 | −37.741 | (d12) | | |
| 13 | −32.510 | 2.30 | 39.6 | 1.80454 |
| 14 | −20.189 | 2.30 | | |
| 15 | −28.627 | 1.20 | 47.5 | 1.78797 |
| 16 | −354.033 | 5.60 | | |
| 17 | −12.899 | 1.20 | 60.3 | 1.62041 |
| 18 | −35.195 | (B.f) | | |
| f | 36.000 | 55.000 | 102.001 | |
| d12 | 14.113 | 7.396 | 1.532 | |
| B.f | 4.785 | 21.749 | 63.714 | | where the numerals in the left-hand side is the sequence from the object side; r, the radius of the curvature; d, the distance between lenses; ν, the Abbe's number; n, the refraction factor at d line (λ=587.6 nm); f, the focal length in the entire system; $F_{NO}$, F number; and 2ω, the angle of view (°).

11. A zoom lens according to claim 1, wherein said zoom lens is constructed in accordance with the data given below:

| f = 36.0~102.0, F_NO = 3.5~10.1, 2ω = 60.1~24.0 | | | |
|---|---|---|---|
| | r | d | ν | n |
| 1 | 27.343 | 2.40 | 47.1 | 1.62374 |
| 2 | 37.529 | 3.10 | | |
| 3 | −25.763 | 5.35 | 46.4 | 1.80411 |
| 4 | −3027.536 | 0.20 | | |
| 5 | 23.686 | 2.55 | 40.9 | 1.79631 |
| 6 | 12.077 | 9.00 | 59.7 | 1.53996 |
| 7 | −33.980 | 0.20 | | |
| 8 | 42.389 | 1.90 | 64.1 | 1.51680 |
| 9 | 9484.102 | 1.05 | | |
| 10 | Diaphragm | 1.25 | | |
| 11 | 228.224 | 1.25 | 56.5 | 1.50137 |
| 12 | −48.239 | (d12) | | |
| 13 | −33.349 | 2.50 | 46.4 | 1.80411 |
| 14 | −20.377 | 2.70 | | |
| 15 | −22.978 | 1.20 | 47.5 | 1.78797 |
| 16 | −180.375 | 6.50 | | |
| 17 | −14.675 | 1.20 | 60.3 | 1.62041 |
| 18 | −28.229 | (B.f) | | |
| f | 36.000 | 55.000 | 102.000 | |
| d12 | 17.874 | 9.099 | 1.437 | |
| B.f | 1.012 | 19.092 | 63.818 | | where the numerals in the left-hand side is the sequence from the object side; r, the radius of the curvature; d, the distance between lenses; ν, the Abbe's number; n, the refraction factor at d line (λ=587.6 nm); f, the focal length in the entire system; $F_{NO}$, F number; and 2ω, the angle of view (°).

* * * * *